US012198394B2

(12) United States Patent
Wang

(10) Patent No.: US 12,198,394 B2
(45) Date of Patent: Jan. 14, 2025

(54) OBJECT RECOGNITION METHOD AND APPARATUS, ELECTRONIC DEVICE AND READABLE STORAGE MEDIUM

(71) Applicant: ZHEJIANG UNIVIEW TECHNOLOGIES CO., LTD., Zhejiang (CN)

(72) Inventor: Hui Wang, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 441 days.

(21) Appl. No.: 17/782,116

(22) PCT Filed: May 14, 2020

(86) PCT No.: PCT/CN2020/090131
§ 371 (c)(1),
(2) Date: Jun. 2, 2022

(87) PCT Pub. No.: WO2021/109458
PCT Pub. Date: Jun. 10, 2021

(65) Prior Publication Data
US 2023/0005296 A1    Jan. 5, 2023

(30) Foreign Application Priority Data
Dec. 2, 2019 (CN) .......................... 201911211382.1

(51) Int. Cl.
*G06V 20/52* (2022.01)
*G06V 10/143* (2022.01)
(Continued)

(52) U.S. Cl.
CPC .......... *G06V 10/143* (2022.01); *G06V 10/147* (2022.01); *G06V 10/255* (2022.01);
(Continued)

(58) Field of Classification Search
CPC .. G06V 10/143; G06V 10/147; G06V 10/255; G06V 10/443; G06V 10/58;
(Continued)

(56) References Cited

U.S. PATENT DOCUMENTS

| 8,049,789 B2 | 11/2011 | Innocent |
| 2004/0146184 A1* | 7/2004 | Hamza .................. G06V 20/52 |
| | | 382/103 |

FOREIGN PATENT DOCUMENTS

| CN | 103826066 A | 5/2014 |
| CN | 109660738 A | 4/2019 |
| CN | 110490042 A | 11/2019 |

OTHER PUBLICATIONS

International Search Report for Application No. PCT/CN2020/090131, dated Sep. 2, 2020, 4 pages including translation.
(Continued)

*Primary Examiner* — Stephen P Coleman
(74) *Attorney, Agent, or Firm* — Morgan, Lewis & Bockius LLP

(57) ABSTRACT

Provided is an object recognition method which includes obtaining a first visible-light image acquired by the first camera device and a second visible-light image acquired by the second camera device; performing exposure processing on the first visible-light image according to the luminance information of the bright area image of the first visible-light image and performing exposure processing on the second visible-light image according to the luminance information of the dark area images of the first visible-light image and/or the second visible-light image, where the dark area image is an area image having a luminance value less than or equal to the preset value; and performing target object detection on the first visible-light image obtained after exposure processing and the second visible-light image obtained after expo-
(Continued)

sure processing and recognizing and verifying a target object according to the detection result.

18 Claims, 5 Drawing Sheets

(51) Int. Cl.
*G06V 10/147* (2022.01)
*G06V 10/20* (2022.01)
*G06V 10/44* (2022.01)
*G06V 10/58* (2022.01)
*G06V 40/16* (2022.01)
*G06V 40/40* (2022.01)

(52) U.S. Cl.
CPC ............ *G06V 10/443* (2022.01); *G06V 10/58* (2022.01); *G06V 20/52* (2022.01); *G06V 40/166* (2022.01); *G06V 40/168* (2022.01); *G06V 40/172* (2022.01); *G06V 40/45* (2022.01); *G06V 2201/07* (2022.01)

(58) Field of Classification Search
CPC .... G06V 20/52; G06V 40/166; G06V 40/168; G06V 40/172; G06V 40/45; G06V 2201/07; G06V 10/25; G06T 5/50; G06T 2207/10004; G06T 2207/20216; G06T 2207/30201; G06T 5/94
USPC ........................................................ 382/103
See application file for complete search history.

(56) References Cited

OTHER PUBLICATIONS

Extended European Search Report for Application No. 20895954.4, dated Nov. 7, 2023, 10 pages.
Kinoshita, et al. "Scene segmentation-based luminance adjustment for multi-exposure image fusion." *IEEE Transactions on Image Processing* 28.8 (2019): 4101-4116.
Steffens, Cristiano Rafael, et al. "Can exposure, noise and compression affect image recognition? an assessment of the impacts on state-of-the-art convnets." *2019 Latin American Robotics Symposium (LARS), 2019 Brazilian Symposium on Robotics (SBR) and 2019 Workshop on Robotics in Education (WRE)*. IEEE, 2019.

* cited by examiner

OBJECT RECOGNITION METHOD AND APPARATUS, ELECTRONIC DEVICE AND READABLE STORAGE MEDIUM

CROSS-REFERENCES TO RELATED APPLICATIONS

This application is a national stage application filed under 35 U.S.C. 371 based on International Patent Application No. PCT/CN2020/090131, filed on May 14, 2020, which claims priority to Chinese Patent Application No. 201911211382.1 filed with the China National Intellectual Property Administration (CNIPA) on Dec. 2, 2019, the disclosures of which is are incorporated herein by reference in their entireties.

TECHNICAL FIELD

The present application relates to the field of image recognition technology, for example, an object recognition method and apparatus, an electronic device and a readable storage medium.

BACKGROUND

In a wide dynamic range scenario, that is, a scenario in which an acquired image includes a bright area image and a dark area image, a recognized object such as a face area in the acquired image is prone to overexposure, overdarkness or ghosting due to the complexity of an environment when a conventional exposure strategy is used, resulting in the failure to effectively detect and recognize faces. There are two processing methods commonly used in the related art. One is the use of digital wide dynamic range technology, and the other is the use of optical wide dynamic range technology, that is, the fusion processing of multiple frames of images.

SUMMARY

The present application provides an object recognition method and apparatus, an electronic device and a readable storage medium to improve the adaptability and the recognition accuracy of object recognition.

An embodiment of the present application provides an object recognition method. The method is applied to an electronic device including a first camera device and a second camera device. The method includes the steps below.

A first visible-light image acquired by the first camera device and a second visible-light image acquired by the second camera device are obtained.

Exposure processing is performed on the first visible-light image according to the luminance information of the bright area image of the first visible-light image. Exposure processing is performed on the second visible-light image according to the luminance information of the dark area images of the first visible-light image and/or the second visible-light image. The bright area image is an area image having a luminance value greater than a preset value. The dark area image is an area image having a luminance value less than or equal to the preset value.

Target object detection is performed on the first visible-light image obtained after exposure processing and the second visible-light image obtained after exposure processing. A target object is recognized and verified according to the detection result.

An embodiment of the present application provides an object recognition apparatus. The apparatus is applied to the electronic device including the first camera device and the second camera device. The apparatus includes an image obtaining module, an exposure processing module and a recognition module.

The image obtaining module is configured to obtain the first visible-light image acquired by the first camera device and the second visible-light image acquired by the second camera device.

The exposure processing module is configured to perform exposure processing on the first visible-light image according to the luminance information of the bright area image of the first visible-light image and perform exposure processing on the second visible-light image according to the luminance information of the dark area images of first visible-light image and/or the second visible-light image. The bright area image is the area image having the luminance value greater than the preset value. The dark area image is the area image having the luminance value less than or equal to the preset value.

The recognition module is configured to perform target object detection on the first visible-light image obtained after exposure processing and the second visible-light image obtained after exposure processing and recognize and verify the target object according to the detection result.

An embodiment of the present application provides an electronic device. The device includes a memory, a processor and a computer program stored on the memory and executable on the processor. When executing the computer program, the processor performs the preceding object recognition method.

An embodiment of the present application provides a readable storage medium. The readable storage medium stores a computer program. When executing the computer program, a processor performs the preceding object recognition method.

REFERENCE LIST

Figure 1:
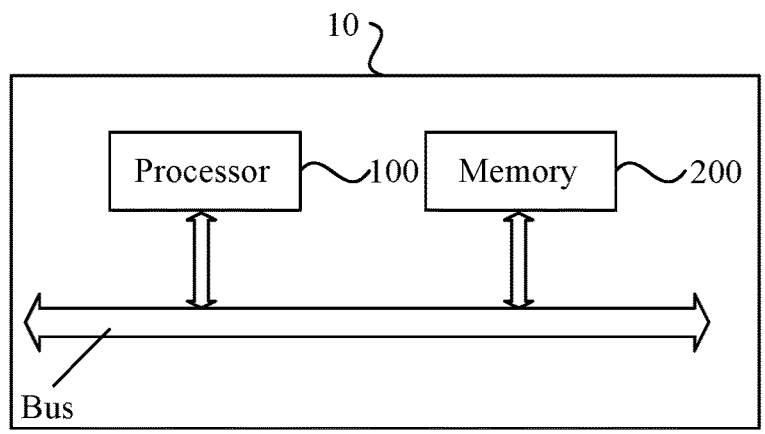
FIG. 1 is a block diagram of an electronic device according to an embodiment of the present application.

10 electronic device
100 processor
200 memory
300 object recognition apparatus 310 image obtaining module
320 exposure processing module
330 recognition module

DETAILED DESCRIPTION

Technical solutions in the embodiments of the present application will be described in conjunction with drawings in the embodiments of the present application. The embodiments described herein are part, not all, of the embodiments of the present application. Generally, the components of this embodiment of the present application described and illustrated in the drawings herein may be arranged and designed through multiple configurations.

The description of the embodiments of the present application shown in the drawings herein is not intended to limit the scope of the present application, but merely illustrates the selected embodiments of the present application.

Similar reference numerals and letters indicate similar items in the drawings, and therefore, once an item is defined in one drawing, the item needs no definition and explanation in subsequent drawings.

In the description of the present application, if the orientational or positional relationships indicated by terms "above", "below", "inside", "outside" and the like are based on the orientational or positional relationships illustrated in the drawings or the orientational or positional relationship that products of the present application are usually used in, which are for the mere purpose of facilitating and simplifying the description of the present application and do not indicate or imply that the apparatus or element referred to has a specific orientation and is constructed and operated in a specific orientation, and thus it is not to be construed as limiting the present application.

Terms "first" and "second" are merely for distinguishing the description and are not to be construed as indicating or implying relative importance.

Referring to FIG. 1, an embodiment of the present application provides an electronic device 10. The electronic device 10 may be an access control device, such as an access control device mounted at a gate of a neighborhood or an access control device at an entrance of an office building. The electronic device 10 may include a memory 200, a processor 100 and a computer program stored on the memory 200 and executable on the processor 100. When the processor 100 executes the program, the electronic device 10 performs the object recognition method of the present application.

The memory 200 is electrically connected to the processor 100 in a direct manner or an indirect manner to implement data transmission or interaction. For example, these components may electrically connected through one or more communication buses or signal lines. The memory 200 stores a software function module that is stored in the memory 200 in the form of software or firmware. The processor 100 runs the software programs and modules stored in the memory 200 to perform multiple function applications and data processing, that is, to perform the object recognition method provided by the embodiments of the present application.

The electronic device 10 may further include camera devices. In this embodiment, the electronic device 10 may include a first camera device and a second camera device. The first camera device and the second camera device may be disposed apart. For example, the first camera device and the second camera device are disposed on the left side and the right side of a surveillance scenario separately to perform image acquisition from different angles. The first camera device and the second camera device may be integrated in the electronic device 10 to be electrically connected to other components included in the electronic device 10. The first camera device and the second camera device may also be connected to other components in the electronic device 10 through wires or wireless communication to implement data transmission and information transmission.

The structure shown in FIG. 1 is merely illustrative. The electronic device 10 may further include more or fewer components than the components shown in FIG. 1 or may have a configuration different from the configuration shown in FIG. 1. Multiple components shown in FIG. 1 may be implemented by hardware, software or a combination thereof.

Figure 2:
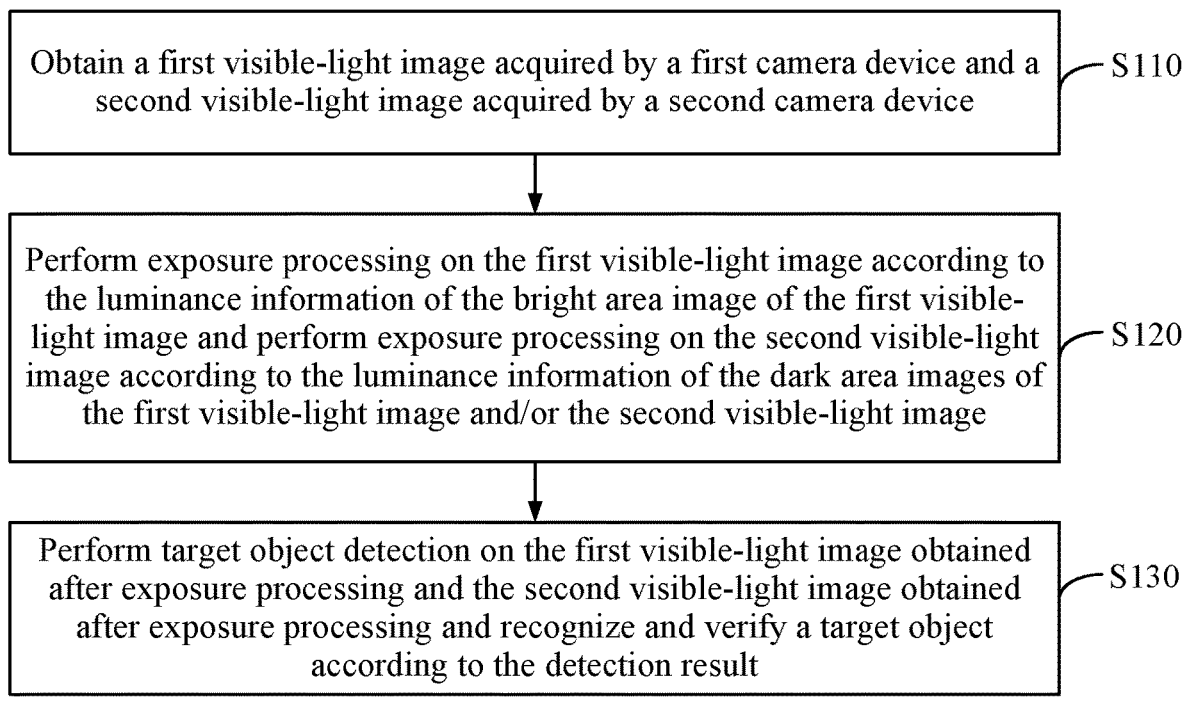
FIG. 2 is a flowchart of an object recognition method according to an embodiment of the present application.

Referring to FIG. 2, FIG. 2 is a flowchart of an object recognition method applied to the electronic device 10 shown in FIG. 1. Multiple steps included in the method are described below.

In step S110, a first visible-light image acquired by the first camera device and a second visible-light image acquired by the second camera device are obtained.

In step S120, exposure processing is performed on the first visible-light image according to the luminance information of the bright area image of the first visible-light image, and exposure processing is performed on the second visible-light image according to the luminance information of the dark area images of the first visible-light image and/or the second visible-light image.

In step S130, target object detection is performed on the first visible-light image obtained after exposure processing and the second visible-light image obtained after exposure processing, and a target object is recognized and verified according to the detection result.

In a wide dynamic range scenario, there is often a scenario in which, for example, the electronic device 10 is mounted at an entrance, and the outside of the entrance is a bright area scenario. When a person stands in an area outside the entrance, and the face is in a bright area environment, exposure processing is performed based on the information of the bright area environment to obtain a clear face image. When the person moves from the area outside the entrance to the entrance, and the face is in a dark area environment, exposure processing is performed based on the information of the dark area environment to obtain a clear face image.

In this embodiment, the first camera device and the second camera device are provided with infrared filters. Infrared light in an environment can be filtered out by the infrared filters to take and obtain a visible-light image. During the implementation, the first camera device is controlled to turn on a configured infrared filter to acquire the first visible-light image, and the second camera device is controlled to turn on a configured infrared filter to acquire the second visible-light image.

Figure 3:
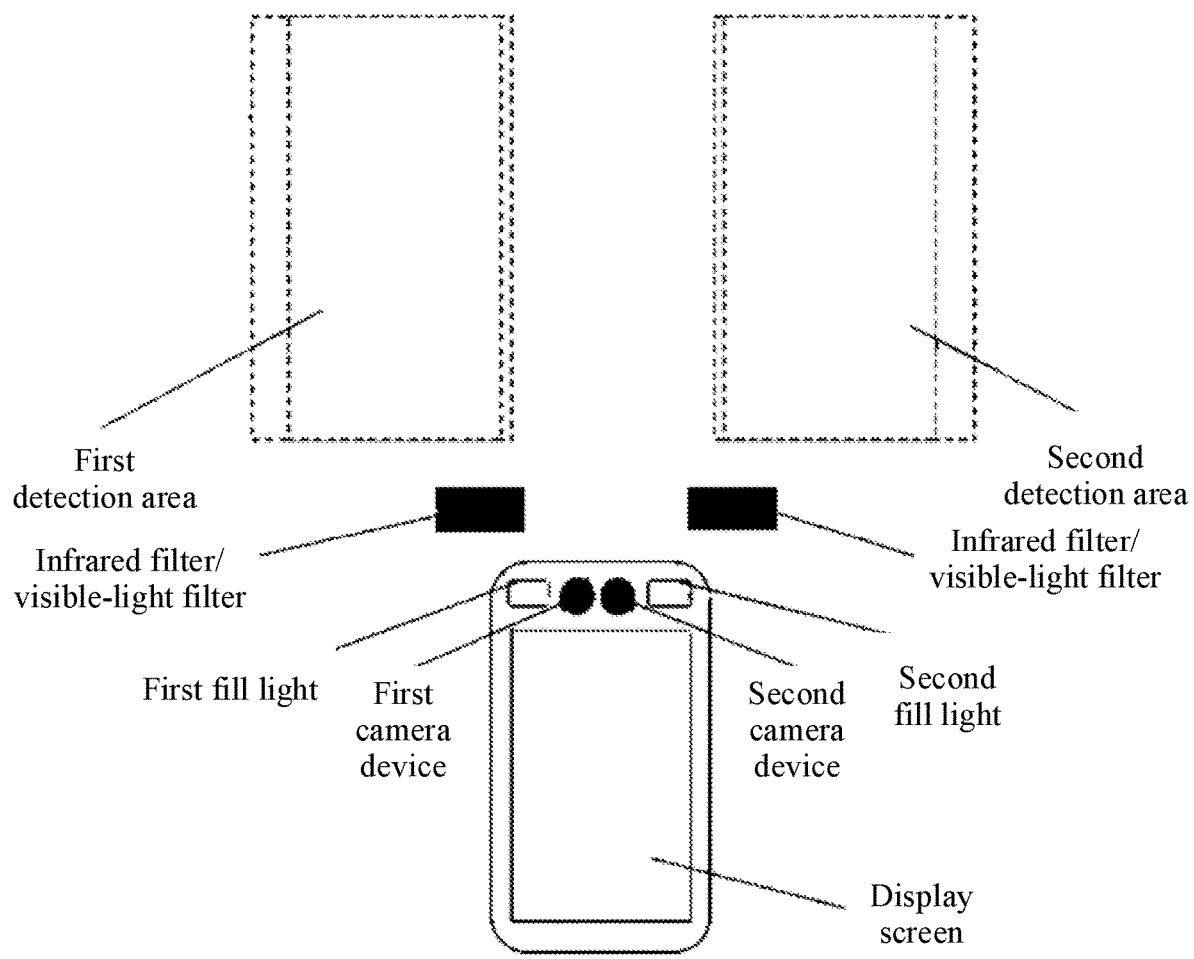
FIG. 3 is a view illustrating image acquisition performed by an electronic device according to an embodiment of the present application.

In this embodiment, the first camera device may acquire an image from a left viewing angle, and the second camera device may acquire an image from a right viewing angle. Processing such as calibration alignment and partial clipping may be performed on the image taken by the first camera device and the image taken by the second camera device to clip a first detection area in the image taken by the first camera device and clip a second detection area in the image taken by the second camera device as shown in FIG. 3. The image included in the first detection area is the same as the image included in the second detection area.

The first visible-light image obtained by the first camera device may be the image in the first detection area. The second visible-light image obtained by the second camera device may be the image in the second detection area.

The bright area image of the first visible-light image may be obtained. The bright area image may be an area image having a luminance value greater than a preset value. For example, the first visible-light image may be divided into multiple area units, for example, multiple area units of multiple rows and columns, or may be divided in another manner. This is not limited in this embodiment. Then the luminance value of the image in each area unit is computed, and an area unit having a luminance value greater than the preset value is used as a bright area image.

The dark area image of the second visible-light image may be obtained in the preceding manner. The dark area image is an area image having a luminance value less than or equal to the preset value.

Exposure processing is performed on the first visible-light image according to the luminance information of the bright area image of the first visible-light image to obtain a clear image of the bright area by exposure. At the same time, exposure processing is performed on the second visible-light image according to the luminance information of the dark area images of the first visible-light image and/or the second visible-light image to obtain a clear image of the dark area in the second visible-light image by exposure. For example, exposure processing may be performed on the second visible-light image according to the luminance information of the dark area image of the first visible-light image. Exposure processing may also be performed on the second visible-light image according to the luminance information of the dark area image of the second visible-light image. Alternatively, exposure processing may also be performed on the second visible-light image according to the combination of the luminance information of the dark area images of the first visible-light image and the second visible-light image.

As can be seen from the preceding description, the target object may be located in a bright area or a dark area. If the target object is located in a bright area, a relatively clear image of the target object can be obtained by performing exposure processing on the first visible-light image. If the target object is located in a dark area, a relatively clear image of the target object can be obtained by performing exposure processing on the second visible-light image.

Therefore, in this embodiment, target object detection is performed based on the first visible-light image obtained after exposure processing and the second visible-light image obtained after exposure processing, and the target object is recognized and verified according to the detection result.

Through the preceding manners, the electronic device 10 having a dual camera can be fully utilized to implement object recognition applicable to a wide dynamic range scenario, thereby improving the adaptability and accuracy of the recognition.

In this embodiment, during exposure processing, a first photometric value is obtained according to the luminance information of the bright area image of the first visible-light image, and exposure processing is performed on the first visible-light image based on the first photometric value. Similarly, a second photometric value is obtained according to the luminance information of the dark area images of the first visible-light image and/or the second visible-light image, and exposure processing is performed on the second visible-light image based on the second photometric value.

During the implementation, when the second photometric value of the dark area image of the second visible-light image is computed, a manner is to directly perform the computation based on the luminance information of the dark area images of the first visible-light image and/or the second visible-light image. Additionally, in view that the most of an image is generally a bright area, the proportion of a dark area is very small, and the luminance information of the dark area is generally difficult to compute, as a possible implementation, the computation may be performed based on preobtained target luminance information. The target luminance information may be obtained in the following manner: Multiple different wide dynamic range scenarios are prebuilt to obtain multiple images having different wide dynamic range values; and dark area images of the multiple images are analyzed to obtain the luminance information of the dark area images of the multiple images. The luminance information of a dark area image that appears most frequently, that is, the most common luminance information of a dark area image, may be used as target luminance information. Average processing or weighted average processing may be performed on the luminance information of the dark area images of the multiple images, and the obtained result may be used as the target luminance information. That is, the luminance information of the dark area images of the first visible-light image and/or the second visible-light image may be configured as the target luminance information.

When exposure processing is performed on the second visible-light image, the second photometric value is obtained according to the target luminance information, and exposure processing is performed on the second visible-light image based on the second photometric value. After the exposure processing, the second visible-light image may be fine-tuned according to the processing effect to make the image effect better.

Figure 4:
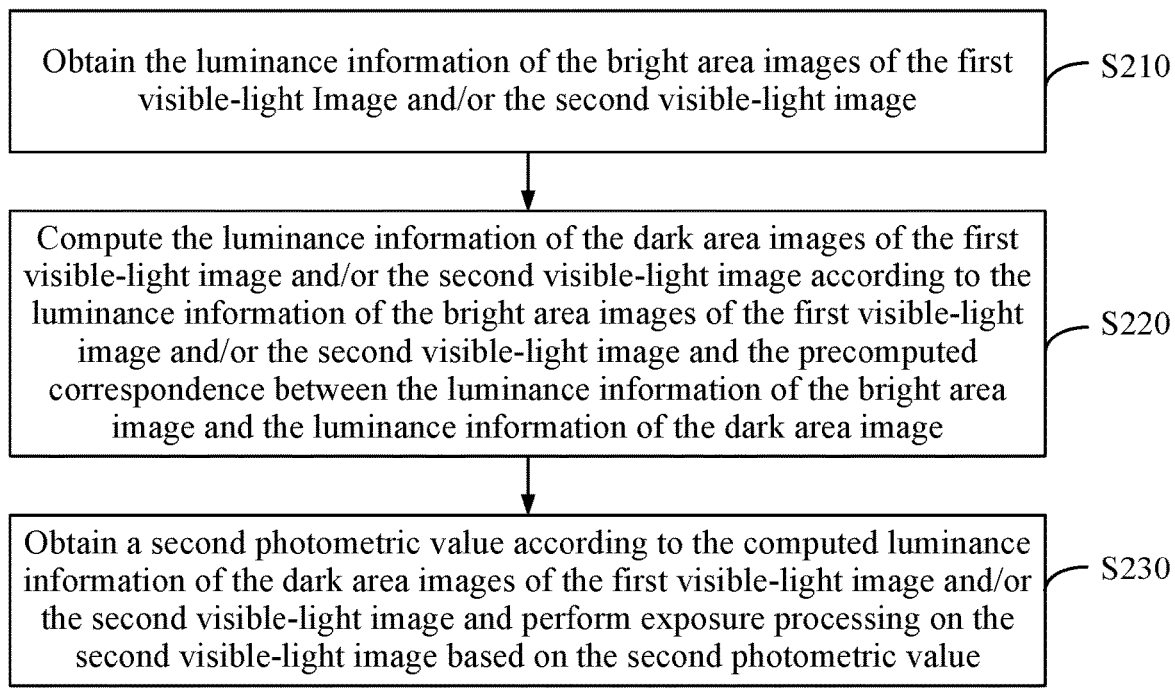
FIG. 4 is a flowchart of an exposure processing method for a second visible-light image according to an embodiment of the present application.

In another implementation, the second photometric value of the dark area image of the second visible-light image may also be indirectly computed based on the bright area images of the first visible-light image and/or the second visible-light image. Optionally, referring to FIG. 4, in this implementation, exposure processing is performed on the second visible-light image by the steps below.

In step S210, the luminance information of the bright area images of the first visible-light image and/or the second visible-light image is obtained.

In step S220, the luminance information of the dark area images of the first visible-light image and/or the second visible-light image is computed according to the luminance information of the bright area images of the first visible-light image and/or the second visible-light image and the pre-computed correspondence between the luminance information of the bright area image and the luminance information of the dark area image.

In step S230, the second photometric value is obtained according to the computed luminance information of the dark area images of the first visible-light image and/or the second visible-light image, and exposure processing is performed on the second visible-light image based on the second photometric value.

In this embodiment, multiple images in a wide dynamic range scenario may be preobtained, and there are no requirements for these images. In this situation, as a possible implementation, these images may be multiple images obtained in a wide dynamic range scenario built in a laboratory, or images taken by a camera device in the same taking scenario as the taking scenario of the second camera device, as long as images in a wide dynamic range scenario including bright areas and dark areas. After these images in the wide dynamic range scenario are processed, the general correspondence between a bright area image and a dark area image in the wide dynamic range scenario, that is, experience data based on big data may be obtained. Based on the experience data, in the case where the luminance information of a bright area is obtained, the corresponding luminance information of a dark area image may be obtained.

In another implementation, the multiple obtained images may also be historical images taken during a historical period by the second camera device or a camera device having the same device parameter as the second camera device. The multiple obtained images may be images taken in the same scenario as the taking scenario of the second camera device.

For the multiple obtained images, the bright area image and the dark area image of each image before exposure processing is performed may be obtained, and the luminance information of the bright area image and the dark area image is computed. In this manner, different correspondences may be obtained according to the luminance information of bright area images and dark area images of the multiple images. Then in the case where the luminance information of a bright area is obtained, the corresponding luminance information of a dark area is obtained according to the correspondence.

For the to-be-processed second visible-light image, the luminance information of the bright area images of the first visible-light image and/or the second visible-light image is firstly obtained, and then the luminance information of the dark area images corresponding to the luminance information of the bright area images of the first visible-light image and/or the second visible-light image is obtained based on the precomputed correspondence. This luminance information is used as the luminance information of the dark area images of the first visible-light image and/or the second visible-light image. The second photometric value is computed based on the computed luminance information of the dark area images, and exposure processing is performed on the second visible-light image based on the second photometric value. In this manner, when the proportion of the dark area image in an acquired image is very small, and it is not convenient to compute the photometric value, the luminance information of the dark area image may be computed indirectly according to the luminance information of the bright area image in the image to compute the photometric value for exposure processing.

Whether exposure processing is performed on the second visible-light image based on the preceding experience data or the historical images, it is to be noted that the illumination conditions should not differ greatly. For example, exposure processing may be performed on the second visible-light image based on the correspondence obtained in a time period corresponding to the current time period. If the current time period is morning time, the preceding correspondence in the morning time period is obtained. Alternatively, exposure processing may be performed on the second visible-light image based on the correspondence obtained in a situation equivalent to the current weather condition. If the current weather condition is rainy weather, the preceding correspondence in the rainy weather is obtained. In this manner, it can be ensured that the based correspondence may be obtained in a scenario relatively consistent with the current scenario. Thus, the accuracy of the indirectly obtained luminance information of a dark area image might be improved.

Figure 5:
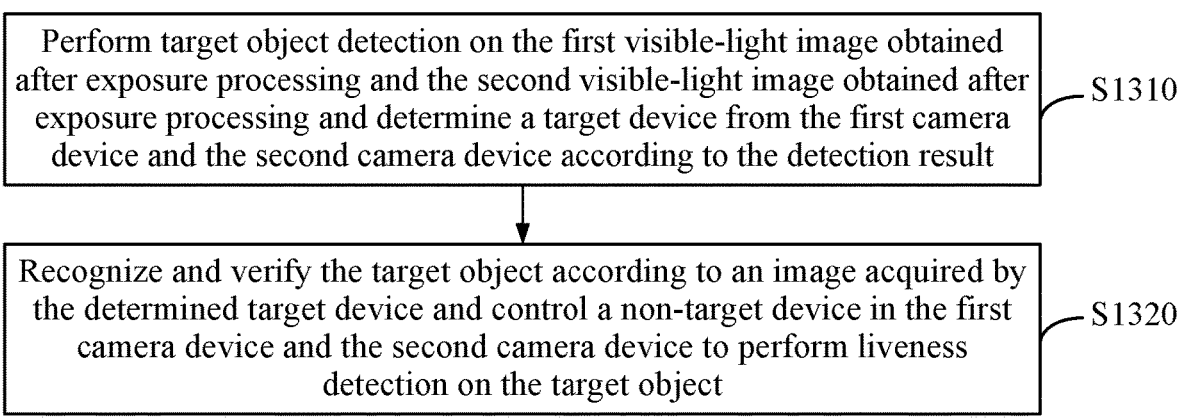
FIG. 5 is a flowchart of a recognition and verification method for a target object according to an embodiment of the present application.

In this embodiment, when object recognition and verification are performed, infrared detection may also be performed on the target object to thereby perform liveness detection. In this manner, a verification error caused by frauds such as the use of an image including a face image and a recaptured screen image is avoided. Referring to FIG. 5, the target object is recognized and verified in the manners below.

In step S1310, target object detection is performed on the first visible-light image obtained after exposure processing and the second visible-light image obtained after exposure processing, and a target device is determined from the first camera device and the second camera device according to the detection result.

In step S1320, the target object is recognized and verified according to an image acquired by the determined target device, and a non-target device in the first camera device and the second camera device is controlled to perform liveness detection on the target object.

In this embodiment, the first camera device and the second camera device are further provided with visible-light filters. Through a visible-light filter, visible light in a scenario can be filtered out to obtain an infrared image. When the target object is verified, it is necessary to use the first camera device and the second camera device in combination. Object detection is performed on an acquired visible-light image by one camera device. Liveness detection is performed on an acquired infrared image by another camera device.

In this embodiment, when the target object is detected in the first visible-light image obtained after exposure processing, and no target object is detected in the second visible-light image obtained after exposure processing, the first visible-light image acquired by the first camera device is determined to use for recognizing and verifying the target object. In this situation, the first camera device is the target device, and the second camera device is a non-target device. The target object is recognized and verified based on the first visible-light image acquired by the first camera device. The second camera device is controlled to perform liveness detection.

When no target object is detected in the first visible-light image obtained after exposure processing, and the target object is detected in the second visible-light image obtained after exposure processing, the second visible-light image acquired by the second camera device is determined to use for recognizing and verifying the target object. In this situation, the second camera device is the target device, and the first camera device is the non-target device. The target object is recognized and verified based on the second visible-light image acquired by the second camera device. The first camera device is controlled to perform liveness detection.

If the target object is detected in the first visible-light image obtained after exposure processing and the second visible-light image obtained after exposure processing, the sharpness of the target object detected in the first visible-light image may be compared with the sharpness of the target object detected in the second visible-light image. If the sharpness of the target object in the first visible-light image is higher, the first visible-light image acquired by the first camera device is determined to use for recognizing and verifying the target object. Similarly, in this situation, the first camera device is the target device, and the second camera device is the non-target device. The target object is recognized and verified based on the first visible-light image acquired by the first camera device. The second camera device is controlled to perform liveness detection. If the sharpness of the target object in the second visible-light image is higher, the second visible-light image acquired by the second camera device is determined to use for recognizing and verifying the target object. In this situation, the second camera device is the target device, and the first camera device is the non-target device. The target object is recognized and verified based on the second visible-light image acquired by the second camera device. The first camera device is controlled to perform liveness detection. Finally, the target object is comprehensively verified by combining the recognition and verification results of the target object and the liveness detection result of the target object.

For example, if liveness detection is performed by the first camera device, the target object is comprehensively verified by combining the liveness detection result of the first camera device and the recognition and verification results obtained by the second camera device. If the liveness detection is performed by the second camera device, the target object is comprehensively verified by combining the liveness detection result of the second camera device and the recognition and verification results obtained by the first camera device.

When the liveness detection result indicates that the target object is a real human body, and the target object detected based on a visible-light image passes the detection, it may be determined that the target object passes the verification.

Figure 6:
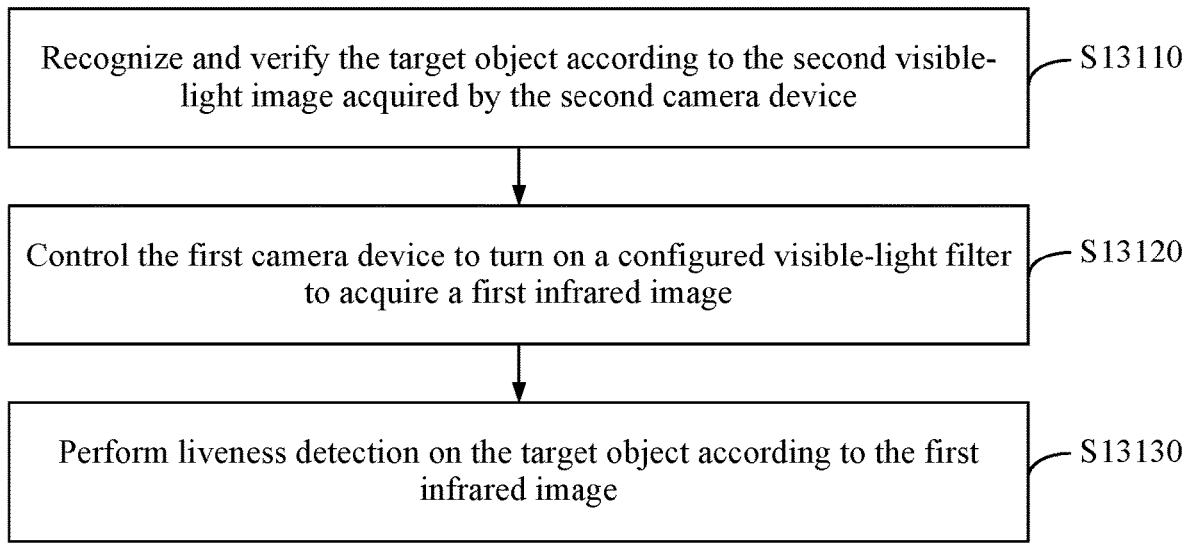
FIG. 6 is a flowchart of a liveness detection method for a target object according to an embodiment of the present application.

In this embodiment, when the second camera device is determined as the target device, that is, liveness detection is performed by the first camera device, referring to FIG. 6, the detection process may be implemented by the steps below.

In step S13110, the target object is recognized and verified according to the second visible-light image acquired by the second camera device.

In step S13120, the first camera device is controlled to turn on a configured visible-light filter to acquire a first infrared image.

In step S13130, liveness detection is performed on the target object according to the first infrared image.

If the first camera device is determined to use to perform liveness detection, it indicates that the target object information in the second visible-light image obtained after exposure processing based on the dark area image in the second visible-light image is better, for example, the sharpness is higher, and the luminance is higher. That is, the second photometric value is used for performing exposure processing, and the effect is better. Therefore, when living object detection is performed on the target object, the first camera device is controlled to switch a filter to enable the configured visible-light filter to acquire the first infrared image, and then liveness detection is performed on the target object according to the acquired first infrared image.

When an infrared image is used for performing liveness detection on the target object, the detection may mainly be performed in the following manner: For example, it is detected whether there is a light spot in the eye area of the face image, if a real human body is determined, a light spot should be present in the eyes in the infrared image; or it is possible to judge whether or not a human body is real by judging the three-dimensional (3D) characteristics of a face area; or it is possible to judge whether or not the human body is real by judging the authenticity of a face skin through the use of subsurface scattering; or liveness detection may also be performed in other manners with reference to the liveness detection method in the related art, and this is not limited in this embodiment.

Figure 7:
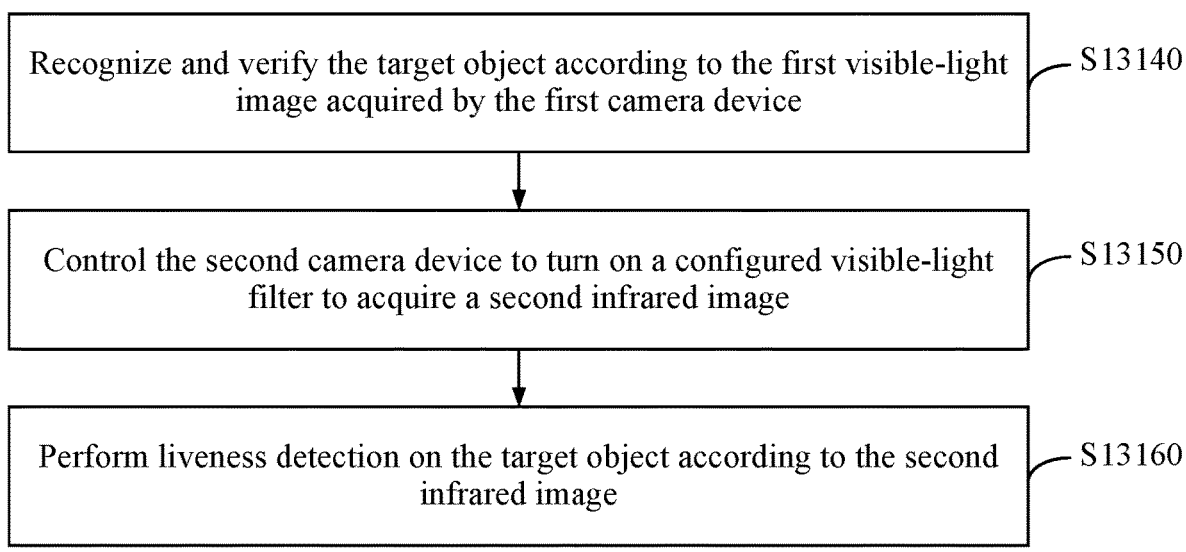
FIG. 7 is a flowchart of a liveness detection method for a target object according to an embodiment of the present application.

If the first camera device is determined as the target device, that is, liveness detection is performed by the second camera device, referring to FIG. 7, the detection processing may be performed in the manners below.

In step S13140, the target object is recognized and verified according to the first visible-light image acquired by the first camera device.

In step S13150, the second camera device is controlled to turn on a configured visible-light filter to acquire a second infrared image.

In step S13160, liveness detection is performed on the target object according to the second infrared image.

If the second camera device is used to perform liveness detection on the target object, it indicates that the target object information in the first visible-light image obtained after exposure processing based on the bright area image in the first visible-light image is better. That is, after the first photometric value is used for performing exposure processing, the image effect is better. Therefore, the second camera device may be controlled to switch a filter to enable the configured visible-light filter to obtain the second infrared image. Then liveness detection is performed on the target object according to the acquired second infrared image.

When the second infrared image is used for performing liveness detection on the target object, the detection method may refer to the preceding description of performing living object detection on the target object based on the first infrared image, and the details are not repeated here.

In this embodiment, the electronic device 10 may further include a display screen. When the first camera device is used to perform liveness detection, and the target object information in the second camera device is used for performing object detection, the second visible-light image taken by the second camera device may be displayed on the display screen. If the second camera device is used to perform liveness detection, and the target object information in the first camera device is used for performing object detection, the first visible-light image taken by the first camera device may be displayed on the display screen.

The electronic device 10 may further include a first fill light and a second fill light. Each of the first fill light and the second fill light may be a combination of an infrared fill light and a visible fill light. The first fill light may be configured to perform fill light operation on the first camera device. The second fill light may be configured to perform fill light operation on the second camera device.

In this embodiment, the phenomenon that the current scenario is not a wide dynamic range scenario may also occur, and in this case, it is not necessary to distinguish between a bright area image and a dark area image. Optionally, in this case, the first camera device is controlled to turn on the configured infrared filter to acquire a visible-light image, and exposure processing is performed on the visible-light image based on the luminance information of the visible-light image. Then target object detection is performed based on the visible-light image obtained after exposure processing, such as face detection. The visible-light image obtained after exposure processing is output to the display screen for display. Moreover, optionally, the second camera device is controlled to turn on the configured visible-light filter to acquire an infrared image, and exposure processing is performed on the infrared image based on the luminance information of the infrared image. Then liveness detection is performed on the target object based on the infrared image obtained after exposure processing, and the detection result of the liveness detection and the face detection result are combined to recognize and verify the target object.

Alternatively, the first camera device may also be controlled to turn on the visible-light filter to acquire an infrared image, and the second camera device may also be controlled to turn on the infrared filter to acquire a visible-light image. This is not limited in this embodiment and may be adjusted according to needs.

In the object recognition scheme provided by this embodiment, for a wide dynamic range scenario, based on the electronic device 10 including the dual camera and without adding more cameras, exposure processing is performed based on the bright area image and dark area image of an image acquired by a camera to implement target object detection when the object is in a bright area or a dark area; then a camera device is used to acquire an infrared image to perform living object detection on the target object; and the target object is recognized and verified in combination with the living object detection result and the target object information in a visible-light image. In this manner, the adaptability of object detection and the recognition accuracy in the wide dynamic range scenario are improved.

Figure 8:
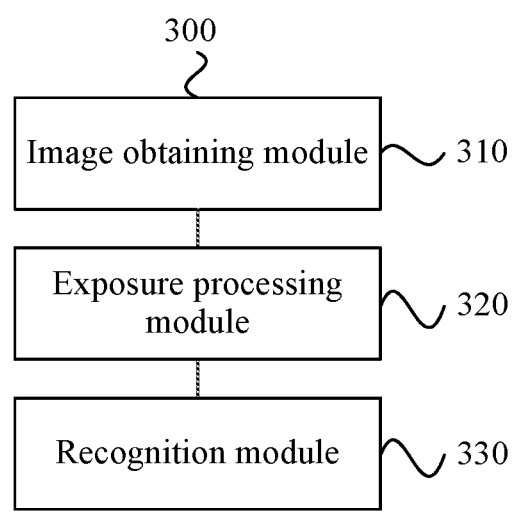
FIG. 8 is a block diagram of function modules of an object recognition apparatus according to an embodiment of the present application.

To perform the corresponding steps in the preceding embodiment and multiple possible manners, referring to FIG. 8, an implementation of an object recognition apparatus 300 is described below. Optionally, the object recognition device 300 may be applied to the preceding electronic device 10 shown in FIG. 1. The object recognition apparatus 300 provided by this embodiment has the same basic principles and technical effects as those of the preceding embodiment. For a brief description, for the parts not mentioned in this embodiment, reference may be made to the corresponding contents in the preceding embodiment. The object recognition apparatus 300 includes an image obtaining module 310, an exposure processing module 320 and a recognition module 330.

The image obtaining module 310 is configured to obtain the first visible-light image acquired by the first camera device and the second visible-light image acquired by the second camera device. The image obtaining module 310 may be used to perform step S110 shown in FIG. 2, and the operation method may refer to the description of step S110.

The exposure processing module 320 is configured to perform exposure processing on the first visible-light image according to the luminance information of the bright area image of the first visible-light image and perform exposure processing on the second visible-light image according to the luminance information of the dark area images of first visible-light image and/or the second visible-light image. The bright area image is the area image having the luminance value greater than the preset value. The dark area image is the area image having the luminance value less than or equal to the preset value. The exposure processing module 320 may be used to perform step S120 shown in FIG. 2, and the operation method may refer to the description of step S120.

The recognition module 330 is configured to perform target object detection on the first visible-light image obtained after exposure processing and the second visible-light image obtained after exposure processing and recognize and verify the target object according to the detection result. The recognition module 330 may be configured to perform step S130 shown in FIG. 2, and the operation method may refer to the description of step S130.

Another embodiment of the present application provides a readable storage medium including computer-executable instructions. When the computer-executable instructions are executed by a computer processor, the related operations of the object recognition method according to any embodiment of the present application are performed.

The embodiments of the present application provide an object recognition method and apparatus, an electronic device 10 and a readable storage medium. The electronic device 10 includes a first camera device and a second camera device. The first visible-light image acquired by the first camera device and the second visible-light image acquired by the second camera device are obtained. Exposure processing is performed on the first visible-light image according to the luminance information of the bright area image of the first visible-light image, and exposure processing is performed on the second visible-light image according to the luminance information of the dark area images of the first visible-light image and/or the second visible-light image. Finally, target object detection is performed on the first visible-light image obtained after exposure processing and the second visible-light image obtained after exposure processing, and the target object is recognized and verified according to the detection result. In this manner, object recognition may be performed according to images obtained under different exposure strategies. Thus, detection and recognition of objects in different luminance areas might be effectively performed, and the adaptability and accuracy of the recognition might be improved.

What is claimed is:

1. An object recognition method, the method being applied to an electronic device comprising a first camera device and a second camera device and the method comprising:
   obtaining a first visible-light image acquired by the first camera device and a second visible-light image acquired by the second camera device;
   performing exposure processing on the first visible-light image according to luminance information of a bright area image of the first visible-light image and performing exposure processing on the second visible-light image according to luminance information of a dark area image of at least one of the first visible-light image or the second visible-light image, wherein the bright area image is an area image having a luminance value greater than a preset value, and the dark area image is an area image having a luminance value less than or equal to the preset value; and
   performing target object detection on the first visible-light image obtained after the exposure processing and the second visible-light image obtained after the exposure processing and recognizing and verifying a target object according to a detection result.

2. The method according to claim 1, wherein obtaining the first visible-light image acquired by the first camera device and the second visible-light image acquired by the second camera device comprises:
   controlling the first camera device to turn on a configured infrared filter to acquire the first visible-light image and controlling the second camera device to turn on a configured infrared filter to acquire the second visible-light image.

3. The method according to claim 1, wherein performing the target object detection on the first visible-light image obtained after the exposure processing and the second visible-light image obtained after the exposure processing and recognizing and verifying the target object according to the detection result comprise:
   in a case where the target object is detected in the first visible-light image obtained after the exposure processing, and no target object is detected in the second visible-light image obtained after the exposure processing, determining to recognize and verify the target object by using the first visible-light image acquired by the first camera device; or in a case where no target object is detected in the first visible-light image obtained after the exposure processing, and the target object is detected in the second visible-light image obtained after the exposure processing, determining to recognize and verify the target object by using the second visible-light image acquired by the second camera device; or in a case where the target object is detected in the first visible-light image obtained after the exposure processing and the second visible-light image obtained after the exposure processing, comparing a sharpness of the target object detected in the first visible-light image with a sharpness of the target object detected in the second visible-light image; in a case where the sharpness of the target object in the first visible-light image is higher than the sharpness of the target object in the second visible-light image, determining to recognize and verify the target object by using the first visible-light image acquired by the first camera device; and in a case where the sharpness of the target object in the first visible-light image is not higher than the sharpness of the target object in the second visible-light image, determining to recognize and verify the target object by using the second visible-light image acquired by the second camera device.

4. A non-transitory readable storage medium storing a computer program, wherein when executing the computer program, a processor performs the object recognition method according to claim 1.

5. The method according to claim 1, wherein performing the exposure processing on the first visible-light image according to the luminance information of the bright area image of the first visible-light image and performing the exposure processing on the second visible-light image according to the luminance information of the dark area image of the at least one of the first visible-light image or the second visible-light image comprise:

obtaining a first photometric value according to the luminance information of the bright area image of the first visible-light image and performing the exposure processing on the first visible-light image based on the first photometric value; and obtaining a second photometric value according to the luminance information of the dark area image of the at least one of the first visible-light image or the second visible-light image and performing the exposure processing on the second visible-light image based on the second photometric value.

6. The method according to claim 5, wherein obtaining the second photometric value according to the luminance information of the dark area image of the at least one of the first visible-light image or the second visible-light image and performing the exposure processing on the second visible-light image based on the second photometric value comprise:

obtaining luminance information of a bright area image of at least one of the first visible-light image or the second visible-light image;

computing the luminance information of the dark area image corresponding to the bright area image according to the luminance information of the bright area image and a precomputed correspondence between the luminance information of the bright area image and the luminance information of the dark area image; and obtaining the second photometric value according to the computed luminance information of the dark area image and performing the exposure processing on the second visible-light image based on the second photometric value.

7. The method according to claim 1, wherein performing the target object detection on the first visible-light image obtained after the exposure processing and the second visible-light image obtained after the exposure processing and recognizing and verifying the target object according to the detection result comprise:

performing the target object detection on the first visible-light image obtained after the exposure processing and the second visible-light image obtained after the exposure processing and determining a target device from the first camera device and the second camera device according to the detection result; and recognizing and verifying the target object according to an image acquired by the determined target device and controlling a non-target device in the first camera device and the second camera device to perform liveness detection on the target object.

8. The method according to claim 7, wherein in a case where the second camera device is determined to be the target device, recognizing and verifying the target object according to the image acquired by the determined target device and controlling the non-target device in the first camera device and the second camera device to perform the liveness detection on the target object comprise:

recognizing and verifying the target object according to the second visible-light image acquired by the second camera device;

controlling the first camera device to turn on a configured visible-light filter to acquire a first infrared image; and performing the liveness detection on the target object according to the first infrared image.

9. The method according to claim 7, wherein in a case where the first camera device is determined to be the target device, recognizing and verifying the target object according to the image acquired by the determined target device and controlling the non-target device in the first camera device and the second camera device to perform the liveness detection on the target object comprise:

recognizing and verifying the target object according to the first visible-light image acquired by the first camera device;

controlling the second camera device to turn on a configured visible-light filter to acquire a second infrared image; and performing the liveness detection on the target object according to the second infrared image.

10. An object recognition apparatus, the apparatus being applied to an electronic device comprising a first camera device and a second camera device and the apparatus comprising:

an image obtaining module configured to obtain a first visible-light image acquired by the first camera device and a second visible-light image acquired by the second camera device;

an exposure processing module configured to perform exposure processing on the first visible-light image according to luminance information of a bright area image of the first visible-light image and perform the exposure processing on the second visible-light image according to luminance information of a dark area image of at least one of the first visible-light image or the second visible-light image, wherein the bright area image is an area image having a luminance value greater than a preset value, and the dark area image is an area image having a luminance value less than or equal to the preset value; and a recognition module configured to perform target object detection on the first visible-light image obtained after the exposure processing and the second visible-light image obtained after the exposure processing and recognize and verify a target object according to a detection result.

11. An electronic device, comprising a first camera device, a second camera device, a memory, a processor and a computer program stored on the memory and executable on the processor, wherein when executing the computer program, the processor performs the following steps:

obtaining a first visible-light image acquired by the first camera device and a second visible-light image acquired by the second camera device;

performing exposure processing on the first visible-light image according to luminance information of a bright area image of the first visible-light image and performing exposure processing on the second visible-light image according to luminance information of a dark area image of at least one of the first visible-light image or the second visible-light image, wherein the bright area image is an area image having a luminance value greater than a preset value, and the dark area image is an area image having a luminance value less than or equal to the preset value; and performing target object detection on the first visible-light image obtained after the exposure processing and the second visible-light image obtained after the exposure processing and recognizing and verifying a target object according to a detection result.

12. The device according to claim 11, wherein obtaining the first visible-light image acquired by the first camera device and the second visible-light image acquired by the second camera device comprises:

controlling the first camera device to turn on a configured infrared filter to acquire the first visible-light image and controlling the second camera device to turn on a configured infrared filter to acquire the second visible-light image.

13. The device according to claim 11, wherein performing the target object detection on the first visible-light image obtained after the exposure processing and the second visible-light image obtained after the exposure processing and recognizing and verifying the target object according to the detection result comprise:

in a case where the target object is detected in the first visible-light image obtained after the exposure processing, and no target object is detected in the second visible-light image obtained after the exposure processing, determining to recognize and verify the target object by using the first visible-light image acquired by the first camera device; or in a case where no target object is detected in the first visible-light image obtained after the exposure processing, and the target object is detected in the second visible-light image obtained after the exposure processing, determining to recognize and verify the target object by using the second visible-light image acquired by the second camera device; or in a case where the target object is detected in the first visible-light image obtained after the exposure processing and the second visible-light image obtained after the exposure processing, comparing a sharpness of the target object detected in the first visible-light image with a sharpness of the target object detected in the second visible-light image; in a case where the sharpness of the target object in the first visible-light image is higher than the sharpness of the target object in the second visible-light image, determining to recognize and verify the target object by using the first visible-light image acquired by the first camera device; and in a case where the sharpness of the target object in the first visible-light image is not higher than the sharpness of the target object in the second visible-light image, determining to recognize and verify the target object by using the second visible-light image acquired by the second camera device.

14. The device according to claim 11, wherein performing the exposure processing on the first visible-light image according to the luminance information of the bright area image of the first visible-light image and performing the exposure processing on the second visible-light image according to the luminance information of the dark area image of the at least one of the first visible-light image or the second visible-light image comprise:

obtaining a first photometric value according to the luminance information of the bright area image of the first visible-light image and performing the exposure processing on the first visible-light image based on the first photometric value; and obtaining a second photometric value according to the luminance information of the dark area image of the at least one of the first visible-light image or the second visible-light image and performing the exposure processing on the second visible-light image based on the second photometric value.

15. The device according to claim 14, wherein obtaining the second photometric value according to the luminance information of the dark area image of the at least one of the first visible-light image or the second visible-light image and performing the exposure processing on the second visible-light image based on the second photometric value comprise:

obtaining luminance information of a bright area image of at least one of the first visible-light image or the second visible-light image;

computing the luminance information of the dark area image corresponding to the bright area image according to the luminance information of the bright area image and a precomputed correspondence between the luminance information of the bright area image and the luminance information of the dark area image; and obtaining the second photometric value according to the computed luminance information of the dark area image and performing the exposure processing on the second visible-light image based on the second photometric value.

16. The device according to claim 11, wherein performing the target object detection on the first visible-light image obtained after the exposure processing and the second visible-light image obtained after the exposure processing and recognizing and verifying the target object according to the detection result comprise:

performing the target object detection on the first visible-light image obtained after the exposure processing and the second visible-light image obtained after the exposure processing and determining a target device from the first camera device and the second camera device according to the detection result; and recognizing and verifying the target object according to an image acquired by the determined target device and controlling a non-target device in the first camera device and the second camera device to perform liveness detection on the target object.

17. The device according to claim 16, wherein in a case where the second camera device is determined to be the target device, recognizing and verifying the target object according to the image acquired by the determined target device and controlling the non-target device in the first camera device and the second camera device to perform the liveness detection on the target object comprise:
- recognizing and verifying the target object according to the second visible-light image acquired by the second camera device;
- controlling the first camera device to turn on a configured visible-light filter to acquire a first infrared image; and
- performing the liveness detection on the target object according to the first infrared image.

18. The device according to claim 16, wherein in a case where the first camera device is determined to be the target device, recognizing and verifying the target object according to the image acquired by the determined target device and controlling the non-target device in the first camera device and the second camera device to perform the liveness detection on the target object comprise:
- recognizing and verifying the target object according to the first visible-light image acquired by the first camera device;
- controlling the second camera device to turn on a configured visible-light filter to acquire a second infrared image; and
- performing the liveness detection on the target object according to the second infrared image.

* * * * *